(12) United States Patent
Wagner

(10) Patent No.: US 7,136,007 B2
(45) Date of Patent: Nov. 14, 2006

(54) HEARING-AID REMOTE CONTROL

(75) Inventor: Josef Wagner, Lachen (CH)

(73) Assignee: Phonak AG, Stafa (CH)

( * ) Notice: Subject to any disclaimer, the term of this patent is extended or adjusted under 35 U.S.C. 154(b) by 490 days.

(21) Appl. No.: 10/368,273

(22) Filed: Feb. 18, 2003

(65) Prior Publication Data

US 2004/0160747 A1    Aug. 19, 2004

(51) Int. Cl.
*G08C 14/12* (2006.01)

(52) U.S. Cl. .................. 341/176; 361/600; 224/245; 224/242

(58) Field of Classification Search ............. 341/173, 341/176; 224/245, 578, 242; 455/575.1; 361/600
See application file for complete search history.

(56) References Cited

U.S. PATENT DOCUMENTS

| | | | |
|---|---|---|---|
| 4,918,737 A | | 4/1990 | Luethi |
| 5,824,002 A | * | 10/1998 | Gentelia et al. ......... 604/164.11 |
| 5,832,296 A | | 11/1998 | Wang et al. |
| 5,832,440 A | * | 11/1998 | Woodbridge et al. ........ 704/275 |
| 6,025,786 A | * | 2/2000 | Rayford ....................... 343/877 |
| 6,050,119 A | * | 4/2000 | Potts ........................ 70/456 R |
| 6,213,619 B1 | | 4/2001 | Yu |
| 6,367,672 B1 | * | 4/2002 | Lind ........................... 224/245 |
| 6,437,836 B1 | * | 8/2002 | Huang et al. ................ 348/734 |
| 6,549,133 B1 | * | 4/2003 | Duncan et al. ........... 340/573.3 |
| 6,606,506 B1 | * | 8/2003 | Jones ........................... 455/566 |
| 6,611,693 B1 | * | 8/2003 | Soini et al. .................. 455/566 |
| 6,728,585 B1 | * | 4/2004 | Neoh ............................ 700/94 |
| 6,729,518 B1 | * | 5/2004 | Badillo et al. .............. 224/578 |
| 6,759,967 B1 | * | 7/2004 | Staller .................... 340/825.72 |
| 6,989,763 B1 | * | 1/2006 | Wall et al. ............. 340/825.69 |

FOREIGN PATENT DOCUMENTS

| | | |
|---|---|---|
| DE | 100 48 338 A | 4/2002 |
| EP | 0 298 323 A | 1/1989 |
| FR | 2 636 445 A | 3/1990 |
| WO | 03/012615 | 2/2003 |

OTHER PUBLICATIONS

Patent Abstracts of Japan vol. 2002, No. 09, Sep. 4, 2002 & JP 2002 139583 A (Citizen Watch Co Ltd), May 17, 2002 Zusammenfassung.

Patent Abstracts of Japan vol. 2002, No. 09, Sep. 4, 2002 & JP 2002 139583 A (Citizen Watch Co Ltd), May 17, 2002 Zusammenfassung.

\* cited by examiner

*Primary Examiner*—Albert K. Wong
(74) *Attorney, Agent, or Firm*—Pearne & Gordon LLP

(57) ABSTRACT

A remote control unit of wireless operation and/or control of electrical and electronic microdevices, such as communication transceivers and hearing aids. The remote control is contained in a clip-on, slip-on, and/or attachable housing or enclosure. The housing or enclosure is designed to be mounted on an object worn or carried by a person using, for instance, a communication device or hearing aid.

12 Claims, 2 Drawing Sheets

HEARING-AID REMOTE CONTROL

This invention relates to a remote control for electric and electronic microdevices such as communication transceivers and hearing aids, allowing their wireless operation as specified in the characterizing feature of claim 1; to a communication-transceiver or hearing-aid remote control unit designed for integration in a wrist watch; and to a hearing aid with a remote control for the operation of said hearing aid.

Wireless remote controls used to operate hearing aids, for one example, have been known before. A remote control for hearing aids, to be separately carried by a person, has been described for instance in Swiss patent CH-PS 670.349. That unit constitutes one more device that must be kept handy by the individual for any necessary intervention in the operation of his or her hearing aid. But not everybody is willing to take out an anything but inconspicuous remote control device in public in order to make necessary changes to its settings, thus making it evident that he or she is wearing a hearing aid which, after all, most wearers would rather conceal.

It is for that reason that EP 1 247 423 suggests incorporating the remote control for a hearing aid for instance in a wrist watch. Based on that idea, various suppliers of electronic microdevices such as hearing aids are marketing two or three design variations of watches that contain such a remote control. As it turns out, however, the watch models selected for instance by the makers of hearing aids for the integration of a remote control are not to the liking of all customers, given that for most people a watch is very much a matter of personal taste. On the other hand, of course, it is not possible to incorporate a remote control in just any watch design. It follows that the actually existing market potential cannot be fully tapped by any means.

It is therefore the objective of this invention to propose a concept that offers a solution to the problem described above.

The invention proposes a remote control as specified in claim 1 for the wireless operation of an electronic microdevice such as a communication transceiver or a hearing aid.

According to the proposed design concept, a remote control for the wireless operation of an electronic microdevice is contained in a clip-on, slip-on or stick-on housing or enclosure so designed as to be attachable to an object of daily use and typically worn or carried on a regular basis by a person utilizing a communication transceiver or a hearing aid. That object may be a wrist watch, a pocket watch, a bracelet, a jewelry item, a piece of clothing, a belt, etc.

It is possible, for example, to provide the housing or enclosure with spring clips or clamping sections allowing it to be attached, preferably in detachable fashion, to the object concerned. It is equally possible to attach the housing or enclosure to the object concerned by means of a velcro strip, an adhesive, suction cups or the like.

The power supply for the remote control is preferably in the form of a battery and in particular a flat cell, or of a rechargeable storage battery, for instance a flexible polymer storage cell.

The housing may also be equipped with control elements such as push buttons in the form of conductive polymers, keys located next to the spring clips or clamping sections, etc. The design of the remote control proper need not be discussed in detail at this point since it is not the primary object of this invention. In this context, reference is instead made to EP 1 247 423 and/or other publications on the subject, such as U.S. Pat. No. 4,063,410, DE 36 42 828 or EP 0 298 323, which contain adequate descriptions of the integration of remote controls for instance in wrist watches.

Characteristic design variations of the remote control per this invention are specified in the subclaims.

The preferred implementation of a remote control proposed per this invention for the wireless operation of a hearing aid or communication device is designed as an attachment to a wrist watch. This remote control that is nearly invisible, permits clip-on attachment to almost any watch design and is easy to operate, lends itself to the attainment of optimal utility and user coverage. The clip-on part is preferably designed to fit the most popular watch cases, meaning that it must be either fully adaptable or that it needs to be produced in very few design variations only. The switching functions are implemented for instance by means of switches integrated in the clips or resilient clamps. The entire electronic circuitry is housed in a completely sealed enclosure. A substantial advantage is offered by the fact that the very slim, flat enclosure can be attached to the back of a wrist watch, making the remote control virtually invisible.

The following describes this invention by way of examples and with reference to the attached drawings in which FIG. 1 is a perspective top view of a conventional wrist watch;

Figure 1:
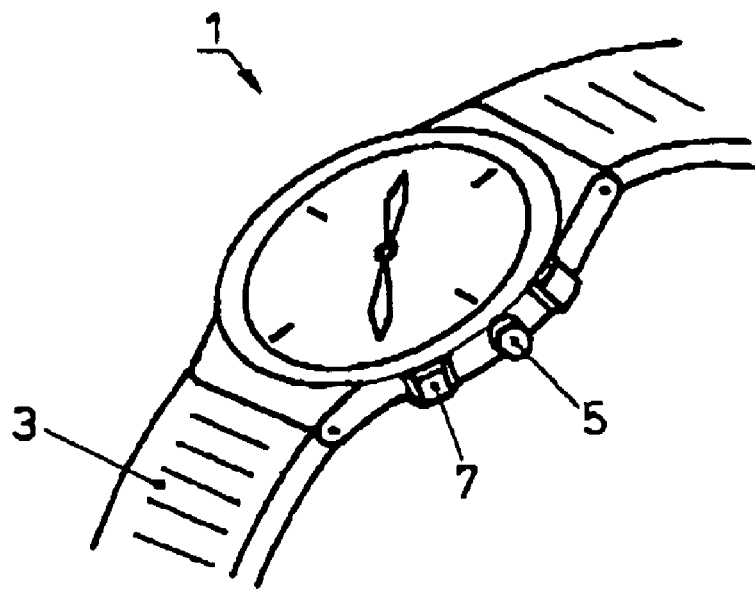

A wrist watch 1 with a watch band 3 and a control element 5 is equipped with a hearing-aid remote control according to this invention, identifiable in FIG. 1 only by two spring clips 7.

Figure 2:
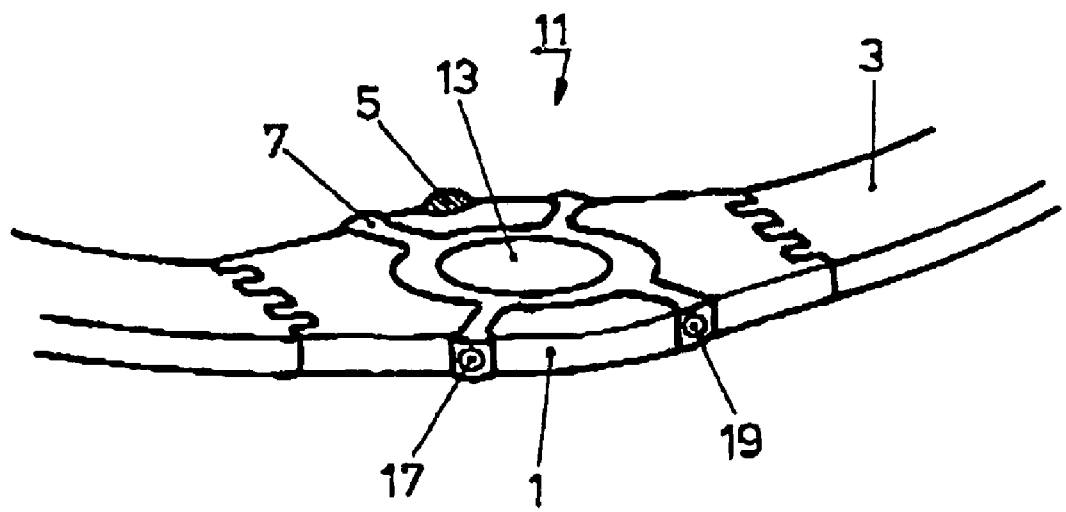
FIG. 2 is a bottom view of the same wrist watch.

FIG. 2 is a perspective bottom view of the wrist watch 1, clearly showing the remote control. The electronic circuitry, i.e. the remote control unit 11, is accommodated in an enclosure 13 on the back of the watch case 1. The retaining feature holding the enclosure 13 in place is a clip-on element with the spring clips 7 that were visible in FIG. 1. The clamping function is obtained by snapping the clamping sections i.e. spring clips 7 over the rim of the wrist watch. These clamping sections may consist of two or more such spring clips or even a full annular clamp. As a possible variation, per the example described below in reference to FIG. 3, the legs of the clips may be spring-loaded in a way as to allow for an adaptation to different watch sizes. Equally possible are design variations with a fixed counterpart on the back of the device or wrist watch to which the remote-control clip can be attached. The fixed counterparts can be mounted on any objects such as bracelets, belts etc. or on the wrist watch illustrated in FIGS. 1 and 2, while the remote-control clip can then be relocated at will and as necessary.

Figure 3:
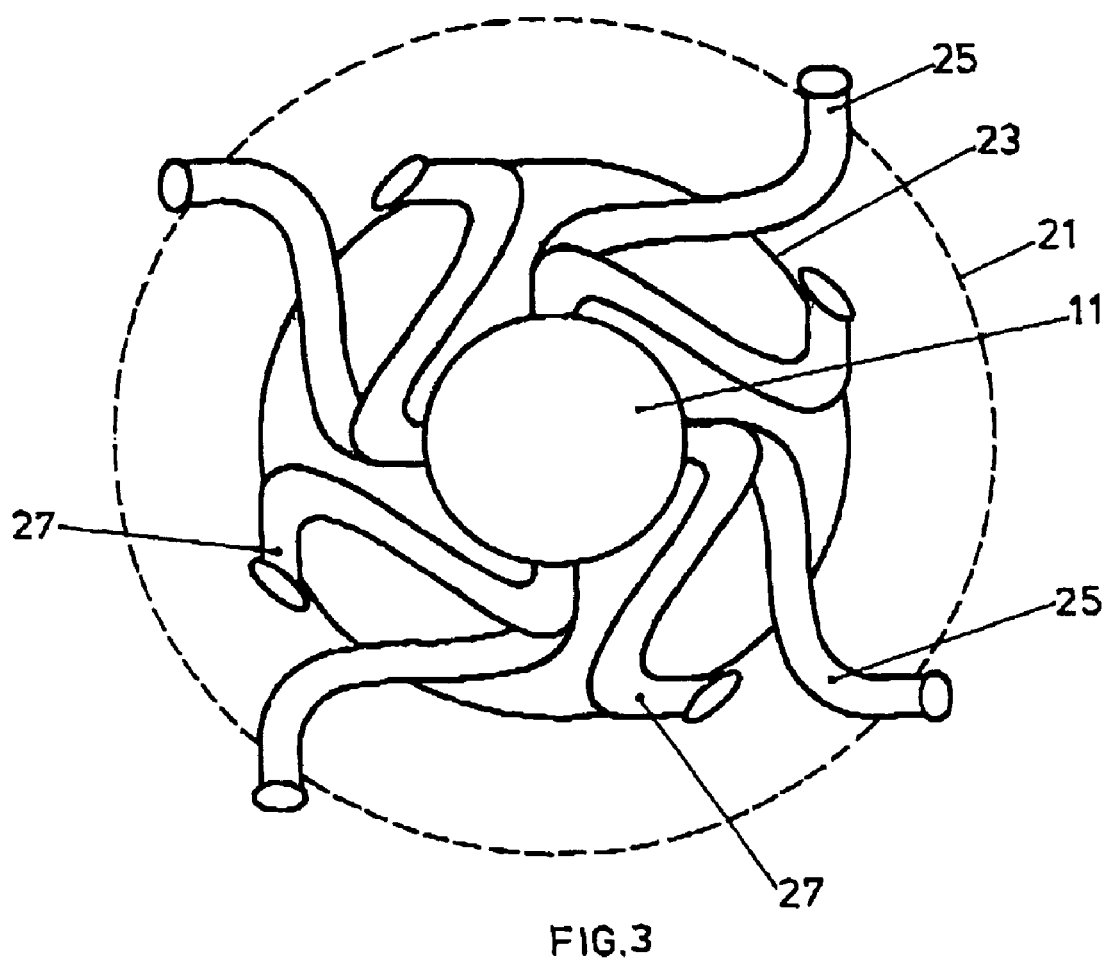
FIG. 3 is a bottom view schematically depicting another configuration of the attachment of a remote control to a wrist watch.

FIG. 3 schematically illustrates in a perpendicular bottom view another mode of attaching a remote control 11 to the back of a wrist watch. In this case it is spring-loaded or resilient legs 25 and, respectively, 27 that fasten the remote control 11 on the perimeter of a wrist watch of which two different sizes are schematically indicated in FIG. 3. One would be a larger wrist watch (dashed outline) such as a men's watch 21 while the other watch with a smaller diameter 23 (solid circular line) may be a ladies' watch. Depending on the size of the watch the legs 25 and 27 are deflected more strongly or, given their resilient restoring force, retracted more tightly, permitting the remote control to be firmly held in place on the bottom side of the wrist watch. The legs 25 and 27 may consist for instance of an elastomeric polymer, or of a rubber-like material such as hydrophilic rubber, one example being unobtanium. It is equally possible to employ resilient metal legs coated for instance with a hydrophilic rubber.

As an alternative to the fastening provisions per FIGS. 1, and 3 other forms of attachment may be used, for instance velcro fasteners, adhesives, suction cups or the like. These other fastening variations make it possible to mount the remote control module almost anywhere i.e. on nearly any object, attaching and removing it at any time with a high degree of flexibility. This flexibility and detachability allows for the use of the remote control module independent of any wrist watch.

As has already been mentioned further above, the power supply may be provided by a battery, preferably a flat cell, or by a rechargeable storage battery in the form of a flexible polymeric storage cell. Suitable power sources could also include active elements such as a thermoelectric converter, a piezoelectric converter, solar cells and the like. These electric power sources may also be used in combination with a storage battery, thus considerably extending the effective charge of the latter.

The remote control can be operated by means of keys or buttons incorporated for instance in the clips 7 clamped around the rim of the wrist watch. Operating controls of that type are symbolized in FIG. 2 by reference numbers 17 and 19.

It is also possible, however, to perform the switching functions using conductive polymers provided on the remote-control mount, on the enclosure or on the clamping sections of the housing.

Finally, as an alternative, the clip, housing or enclosure with the remote control module can be produced by a stereolithographic or a so-called additive process. This allows for the customization of a 'tailor-made' remote-control attachment, and thus a personalized clip-on solution, mountable on a watch, a cell phone, a ring, a clothing item etc., for each individual customer.

The invention claimed is:

1. A remote control unit for wireless control of an electronic microdevice comprising:

electronic circuitry for controlling the microdevice and a housing wherein the circuitry is located within the housing and the housing includes an attachment means shaped for attaching to a wrist-watch case.

2. The remote control unit in claim 1 wherein the attachment means is a plurality of spring clips.

3. The remote control unit in claim 1 wherein the attachment means is a full annular clamp.

4. The remote control unit in claim 1 further comprising an electrical power source.

5. The remote control unit in claim 1 wherein the microdevice is a communication transceiver or a hearing aid.

6. The remote control unit in claim 1 wherein the attachment means is shaped for attaching to the back of the wrist-watch case.

7. The remote control unit as in claim 4 wherein the electrical power source is selected from the group comprising a flat cell battery, a rechargeable battery, a flexible polymeric storage battery, an active element, a thermoelectric converter, a piezoelectric converter, and a solar cell.

8. The remote control unit in claim 2 further comprising control elements on the housing located next to the spring clips.

9. The remote control unit in one of claims 2, 4, or 8, further including a counter part for attachment to the wrist-watch case.

10. The remote control unit in one of claims 2, 4, or 8 wherein the housing is produced by an additive process for custom fit to the watch case.

11. A hearing aid with the wireless remote control unit in claim 1 for controlling the hearing aid.

12. A remote control unit for wireless control of an electronic microdevice comprising:

electronic circuitry for controlling the microdevice and a housing wherein the circuitry is located within the housing and the housing includes a plurality of resilient legs shaped for attaching to a wrist-watch case.

* * * * *